(12) United States Patent
Wang et al.

(10) Patent No.: US 12,355,280 B2
(45) Date of Patent: *Jul. 8, 2025

(54) BATTERY PACK

(71) Applicant: Greenworks (Jiangsu) Co., Ltd., Changzhou (CN)

(72) Inventors: Huage Wang, Changzhou (CN); Chuntao Lu, Changzhou (CN); Xian Zhuang, Changzhou (CN); Baoan Li, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,184

(22) Filed: Sep. 26, 2023

(65) Prior Publication Data

US 2024/0022091 A1 Jan. 18, 2024

Related U.S. Application Data

(63) Continuation of application No. 17/340,107, filed on Jun. 7, 2021, now Pat. No. 11,804,722.

(30) Foreign Application Priority Data

Jun. 9, 2020 (CN) .......................... 202010516894.5

(51) Int. Cl.
*H02J 7/00* (2006.01)
*H01M 10/42* (2006.01)
(Continued)

(52) U.S. Cl.
CPC ......... *H02J 7/0024* (2013.01); *H01M 10/425* (2013.01); *H01M 10/441* (2013.01);
(Continued)

(58) Field of Classification Search
CPC .......... H02J 7/0024; H02J 7/342; H02J 7/007; H02J 7/0019; H02J 7/0045; H02J 7/0063;
(Continued)

(56) References Cited

U.S. PATENT DOCUMENTS 11,804,722 B2 * 10/2023 Wang .................. H01M 10/425
2016/0226277 A1 * 8/2016 Wenger ................. H02J 7/0044
(Continued)

FOREIGN PATENT DOCUMENTS

| CN | 109120037 A | 1/2019 |
| CN | 109713764 A | 5/2019 |

(Continued)

OTHER PUBLICATIONS

Search Report for corresponding application EP 21178436 filed Jun. 9, 2021, Mail date Oct. 10, 2021.

*Primary Examiner* — Edward Tso
*Assistant Examiner* — Aaron Piggush

(57) ABSTRACT

A battery pack is provided. The battery pack includes a housing, a plurality of battery sets arranged in the housing, and a power supply system. The power supply system includes a switch control circuit for controlling a series-parallel connection mode of the plurality of battery sets, a main control chip for controlling the discharge of the plurality of battery sets by the switch control circuit, a wake-up circuit for waking up the power supply system of the battery pack when the main control chip receives a wake-up signal, a self-locking circuit connected to the switch control circuit which switches to a disabled state when the self-locking circuit is triggered; and a USB circuit and an extended power output interface, connected to the plurality of battery sets for outputting power to charge external devices.

20 Claims, 7 Drawing Sheets

(51) Int. Cl.
*H01M 10/44* (2006.01)
*H02J 7/34* (2006.01)

(52) U.S. Cl.
CPC .......... *H02J 7/0019* (2013.01); *H02J 7/0045* (2013.01); *H02J 7/0063* (2013.01); *H02J 7/007* (2013.01); *H02J 7/342* (2020.01); *H02J 2207/30* (2020.01)

(58) Field of Classification Search
CPC .... H02J 2207/30; H02J 9/061; H01M 10/425; H01M 10/441
USPC ................ 320/117, 107, 112, 127, 140, 163
See application file for complete search history.

(56) References Cited

U.S. PATENT DOCUMENTS

| | | |
|---|---|---|
| 2016/0311094 A1 | 10/2016 | Mergener et al. |
| 2017/0170671 A1* | 6/2017 | Mergener .............. H02J 7/0048 |
| 2020/0127467 A1* | 4/2020 | Li ........................... H02J 7/342 |
| 2020/0280106 A1* | 9/2020 | Hauser .............. H01M 10/4257 |
| 2020/0287176 A1 | 9/2020 | Lu |
| 2021/0143485 A1* | 5/2021 | Kim ..................... H02J 7/0029 |

FOREIGN PATENT DOCUMENTS

| | | |
|---|---|---|
| JP | 2020058124 A | 4/2020 |
| WO | 2017189786 A1 | 11/2017 |

* cited by examiner

BATTERY PACK

CROSS REFERENCE TO RELATED APPLICATION

The present application is a continuation application of U.S. patent application Ser. No. 17/340,107 filed on Jun. 7, 2021. U.S. Ser. No. 17/340,107 claims the benefit of priority to Chinese Patent Application No. CN 202010516894.5, entitled "BATTERY PACK POWER SUPPLY SYSTEM AND BATTERY PACK POWER SUPPLY METHOD", filed with CNIPA on Jun. 9, 2020, the disclosure of which is incorporated herein by reference in its entirety.

FIELD OF TECHNOLOGY

The present disclosure provides a battery pack power supply system and a battery pack power supply method.

BACKGROUND

At present, in the battery pack industry, to extend the universality of a battery pack, two groups of batteries are connected in series or parallel to form a dual-voltage battery pack (hereinafter referred to as battery pack). The battery pack provides two voltage specifications to power an electric tool. Commonly used battery packs include 20V/40V battery packs, 24V/48V battery packs, and 40V/80V battery packs.

There are two methods to switch between series connection and parallel connection of two groups of batteries: an electronic switch method and a mechanical structure method. The electronic switch method is achieved by three controlled electronic switches. In the mechanical structure method, series or parallel connection of two groups of batteries is achieved by a female tab abutting against an electric tool or charger. If the female tab connects positive and negative poles of a group A battery and a group B battery together, then the two groups of batteries form a parallel relationship; and if the female tab connects the negative pole of the group A battery to the positive pole of the group B battery, and power is output from the positive pole of the Group A and the negative pole of the Group B, then the two groups form a series relationship.

A traditional dual-voltage lithium battery pack simply provides power to an electric tool, but cannot achieve many other functions.

In view of this, there is indeed a need to improve existing battery packs to make them applicable in more scenarios.

SUMMARY

An object of the present disclosure is to provide a battery pack power supply system and a battery pack power supply method. The battery pack power supply system not only can supply power to an electric tool, but also can directly charge an external device such as a mobile phone, which extends the use of a battery pack.

To achieve the above object, the present disclosure provides a battery pack power supply system, including: a first battery set and second battery set; a switch control circuit connected with electronic switches, to control the first battery set and the second battery set to be connected in series or in parallel; a main control chip connected with the first battery set, the second battery and the switch control circuit, respectively, to control the electronic switches to be open or closed to discharge the first battery set and the second battery set; a wake-up circuit connected with the main control chip, to wake up the entire battery pack power supply system; a USB circuit connected with the first battery set, the second battery set and the main control chip, respectively, to output power for charging an external device under the control of the main control chip; and a self-locking circuit connected with the switch control circuit, to disable the electronic switches when the switch control circuit is disabled.

As an improvement of the present disclosure, the electronic switches further include a first switch, a second switch and a third switch; when the main control chip controls the first switch and the second switch to be closed and the third switch to be open, the first battery set and the second battery set are connected in parallel with each other; and when the main control chip controls the first switch and the second switch to be open and the third switch to be closed, the first battery set and the second battery set are connected in series with each other.

As an improvement of the present disclosure, the battery pack power supply system further includes a housing and a circuit board accommodated in the housing, wherein the first battery set and the second battery set are both accommodated in the housing, and the switch control circuit, the main control chip, the wake-up circuit, the USB circuit and the self-locking circuit are all formed on the circuit board; and the housing is provided with an extended power output interface connected to the USB circuit and a cover plate for covering the extended power output interface, the cover plate being slidably arranged to expose or cover the extended power output interface.

As an improvement of the present disclosure, the wake-up circuit includes a microswitch wake-up circuit, the microswitch wake-up circuit including a microswitch, and when the cover plate slides to expose the extended power output interface, the cover plate synchronously triggers the microswitch, such that the entire battery pack power supply system is woken up.

As an improvement of the present disclosure, the wake-up circuit is a buttoned wake-up circuit, the buttoned wake-up circuit including a button provided on the housing, and the entire battery pack power supply system is woken up after the button is pressed.

As an improvement of the present disclosure, the USB circuit is provided with a step-down component and a current-limiting component to perform voltage step-down and current-limiting operations on a voltage output from the battery pack power supply system, a voltage after the step-down and current-limiting operations being output to charge the external device.

As an improvement of the present disclosure, the self-locking circuit is configured such that the switch control circuit is not controlled by the main control chip when the switch control circuit is automatically locked.

As an improvement of the present disclosure, the battery pack power supply system further includes a first analog front-end connected in parallel with the first battery set and a second analog front-end connected in parallel with the second battery set; the first analog front-end is connected with the main control chip to collect a voltage of the first battery set and transmit the voltage to the main control chip; and the second analog front-end is connected with the main control chip to collect a voltage of the second battery set and transmit the voltage to the main control chip.

As an improvement of the present disclosure, when the voltages of the first battery set and second battery set are lower than a certain value, the main control chip disables the USB circuit to stop charging the external device and controls the entire battery pack power supply system to shut down.

As an improvement of the present disclosure, the battery pack power supply method further includes a communication isolation circuit, which is connected to the second analog front-end at one end and to the main control chip at the other end, so that the second analog front-end communicates with the main control chip in a bidirectional isolation manner through the communication isolation circuit.

To achieve the above object, the present disclosure further provides a battery pack power supply method applied to a battery pack power supply system, the battery pack power supply system including a main control chip, a first battery set and a second battery set, a switch control circuit, a wake-up circuit, a USB circuit and a self-locking circuit. The battery pack power supply method mainly includes the following steps:

S1, inserting an external device USB charging cable into an extended power output interface of the battery pack power supply system, such that the external device USB charging cable is brought into electrical conduction with the USB circuit of the battery pack power supply system;

S2, the wake-up circuit waking up the entire battery pack power supply system;

S3, the main control chip controlling the switch control circuit, such that the first battery set and the second battery set are connected in series or in parallel and the first battery set and the second battery set are discharged; and S4, the main control chip enabling the USB circuit, such that the USB circuit outputs power to charge an external device.

As an improvement of the present disclosure, the battery pack power supply system further includes a housing and a circuit board accommodated in the housing; the first battery set and the second battery set are both accommodated in the housing, and the switch control circuit, the main control chip, the wake-up circuit, the USB circuit and the self-locking circuit are all formed on the circuit board; the extended power output interface is provided on the housing and connected to the USB circuit; and the housing is further provided with a cover plate for covering the extended power output interface, the cover plate slidably arranged to expose or cover the extended power output interface.

As an improvement of the present disclosure, the wake-up circuit further includes a microswitch wake-up circuit, the microswitch wake-up circuit including a microswitch, and step S2 is specifically: when the cover plate slides to expose the extended power output interface, the cover plate synchronously triggering the microswitch such that the entire battery pack power supply system is woken up.

As an improvement of the present disclosure, the wake-up circuit is a buttoned wake-up circuit, the buttoned wake-up circuit including a button provided on the housing, and step S2 is specifically: waking up the entire battery pack power supply system when the button is pressed.

As an improvement of the present disclosure, the switch control circuit is further electrically connected with electronic switches, the electronic switches including a first switch, a second switch and a third switch; when the main control chip controls the first switch and the second switch to be closed and the third switch to be open, the first battery set and the second battery set are connected in parallel with each other; and when the main control chip controls the first switch and the second switch to be open and the third switch to be closed, the first battery set and the second battery set are connected in series with each other.

As an improvement of the present disclosure, the battery pack power supply method further includes the following steps:

S5, when the main control chip detects no charging current in the USB circuit, disabling the USB circuit; and S6, when the main control chip detects that a charging current of the USB circuit is greater than a certain value, enabling the USB circuit and continuing detecting the charging current of the USB circuit.

As an improvement of the present disclosure, the USB circuit is further provided with a step-down component and a current-limiting component to perform voltage step-down and current-limiting operations on a voltage output from the battery pack power supply system, a voltage after the step-down and current-limiting operations being output to charge the external device; and the self-locking circuit is connected with the switch control circuit, such that the switch control circuit is not controlled by the main control chip when the switch control circuit is disabled.

As an improvement of the present disclosure, the battery pack power supply system further includes a first analog front-end connected in parallel with the first battery set and a second analog front-end connected in parallel with the second battery set; the first analog front-end is connected with the main control chip to collect a voltage of the first battery set and transmit the voltage to the main control chip; and the second analog front-end is connected with the main control chip to collect a voltage of the second battery set and transmit the voltage to the main control chip.

As an improvement of the present disclosure, the battery pack power supply method further includes: step S7, the first analog front-end and the second analog front-end respectively detecting the voltages of the first battery set and the second battery set in real time, and when the voltages of the first battery set and second battery set are lower than a certain value, the main control chip disabling the USB circuit to stop charging the external device and controlling the entire battery pack power supply system to shut down.

As an improvement of the present disclosure, the battery pack power supply method further includes a communication isolation circuit, which is connected to the second analog front-end at one end and to the main control chip at the other end, so that the second analog front-end communicates with the main control chip in a bidirectional isolation manner through the communication isolation circuit.

The present disclosure has the beneficial effects: on the one hand, with the USB circuit provided in the present disclosure, voltage step-down and current-limiting operations may be performed by the USB circuit on the voltage output from the battery pack power supply system, such that the voltage after the step-down and current-limiting operations may be used to charge an external device such as a mobile phone, so the battery pack may be applied in more scenarios; on the other hand, the self-locking circuit is provided such that when the switch control circuit is disabled, the electronic switches fail and are no longer controlled by the main control chip due to the self-locking circuit, thereby protecting the entire battery pack power supply system is protected.

DETAILED DESCRIPTION

Figure 1:
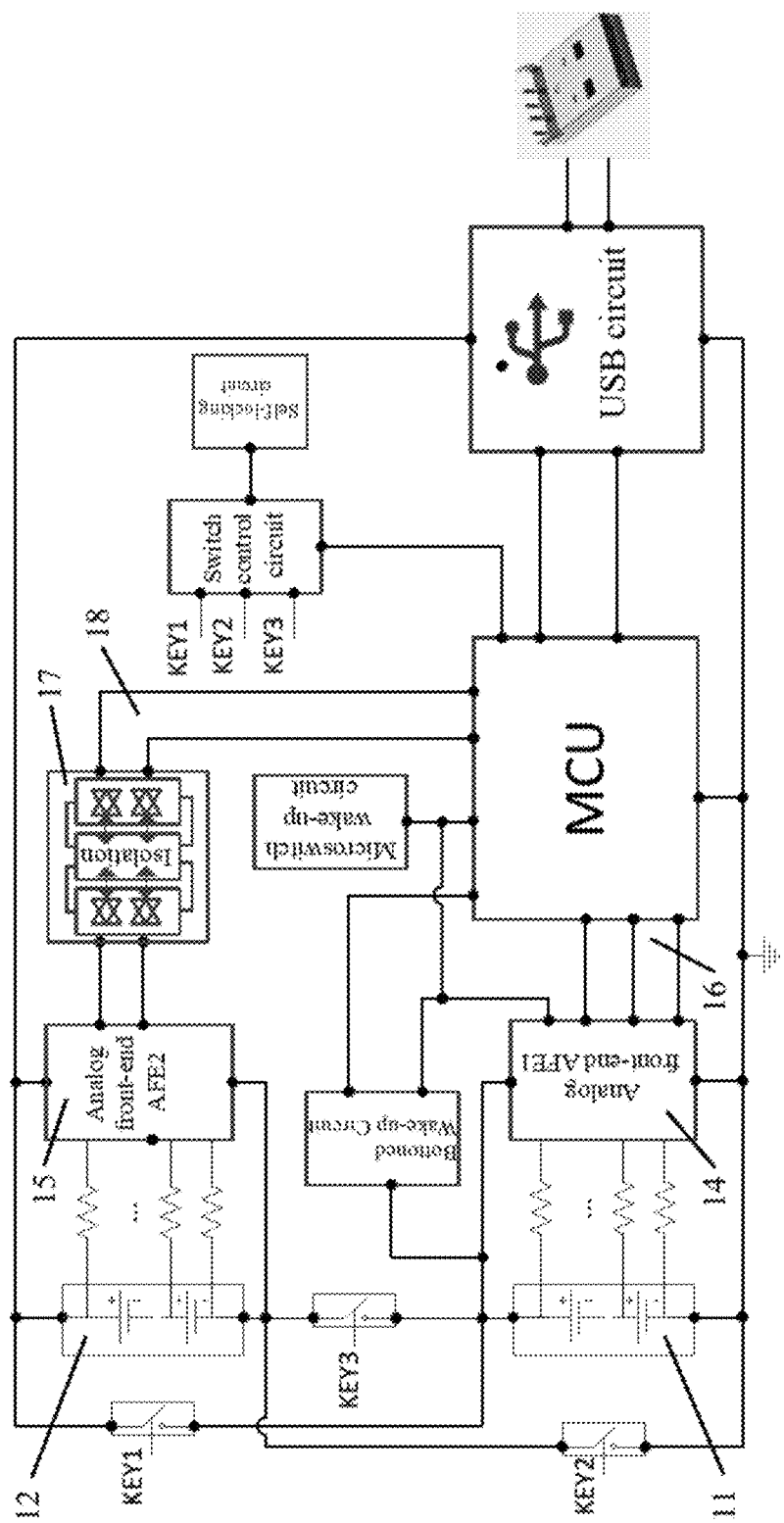
FIG. 1 is a structure diagram of a first embodiment of a battery pack power supply system of the present disclosure.
Figure 2:
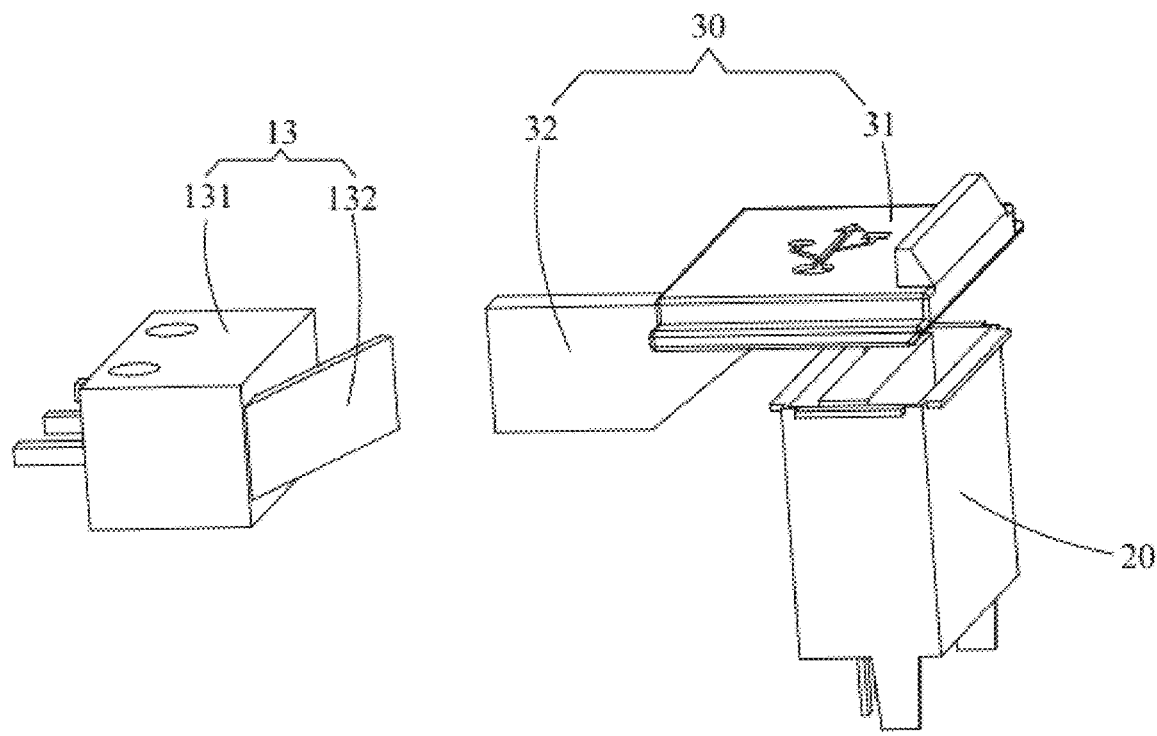
FIG. 2 is an exploded diagram showing mutual cooperation between a microswitch and a cover plate.
Figure 3:
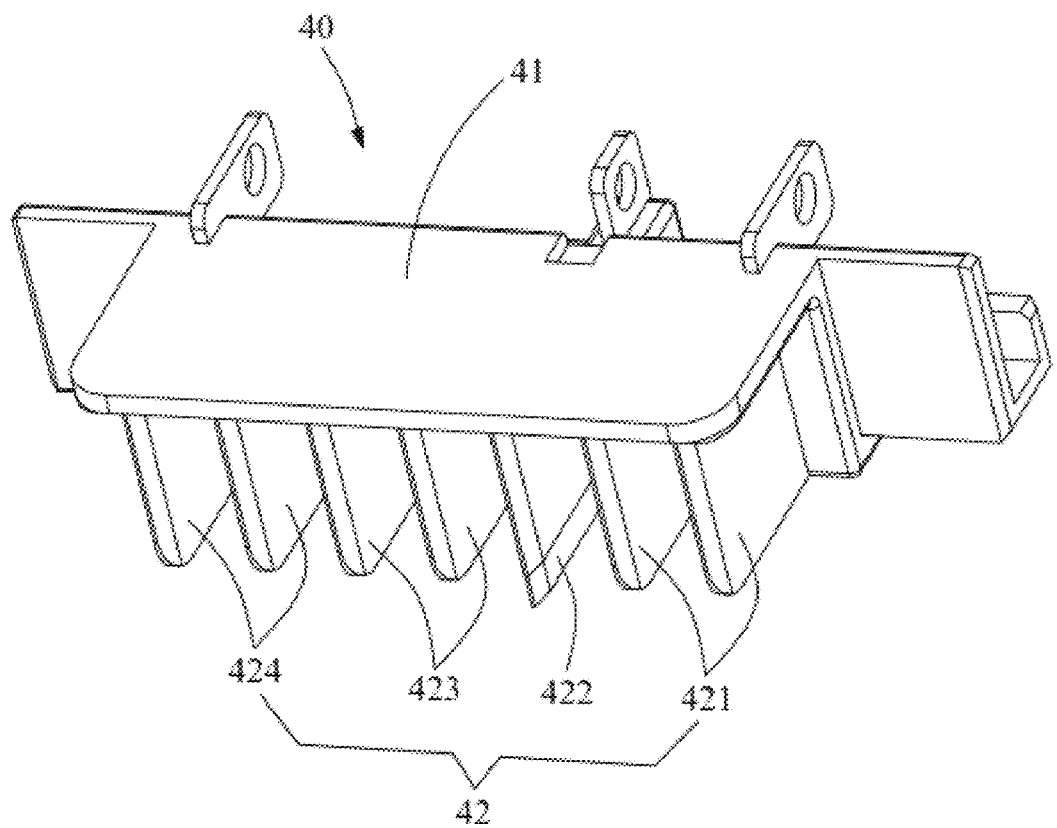
FIG. 3 is a three-dimensional structure diagram of a contact tab of an electric tool.
Figure 4:
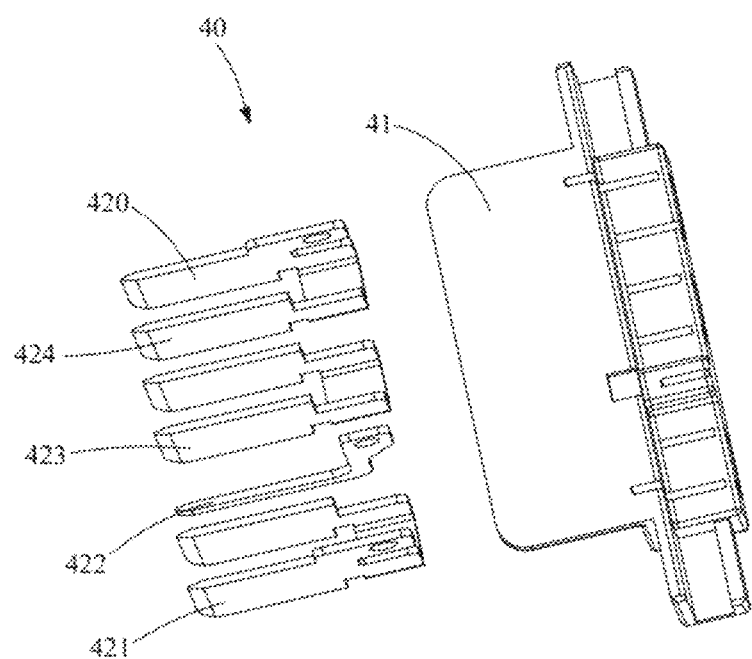
FIG. 4 is an exploded diagram of FIG. 3.

To make the object, technical solutions and advantages of the present disclosure clearer, the present disclosure will be described in detail below in conjunction with the accompanying drawings and specific embodiments.

As shown in FIGS. 1 to 4, the present disclosure provides a battery pack power supply system applied to a battery pack. The battery pack power supply system includes a housing (not shown), and a first battery set 11, a second battery set 12 and a circuit board (not shown) accommodated in the housing, the circuit board being electrically connected with the first battery set 11 and the second battery set 12, and the circuit board being formed with a switch control circuit, a main control chip (MCU), a wake-up circuit, a USB circuit and a self-locking circuit.

The housing is provided with an extended power output interface 20 connected to the USB circuit and a cover plate 30 for covering the extended power output interface 20, the cover plate 30 being slidably arranged to expose or cover the extended power output interface 20. Specifically, the extended power output interface 20 is a USB interface matched with the USB circuit, and the cover plate 30 includes a cover part 31 that covers the extended power output interface 20 and a trigger part 32 that extends backward from the cover part 31.

The first battery set 11 and the second battery set 12 may be connected in series or in parallel, and then may output two types of operating voltages to supply power to electric tools with different demands. Of course, when the battery pack power supply system itself is not charging and not connected to an electric tool, the first battery set 11 and the second battery set 12 may also output voltages through the extended power output interface 20 to charge an external device such as a mobile phone. In this case, the first battery set 11 and the second battery set 12 may be connected in series or in parallel, depending on the actual situation. In the present disclosure, whether the battery sets are connected in series parallel mainly depends on the voltage demand of the corresponding external device detected by the USB circuit.

The switch control circuit is connected with electronic switches, to control the first battery set 11 and the second battery set 12 to be connected in series or in parallel; and the main control chip (MCU) is connected with the first battery set 11, the second battery set 12 and the switch control circuit, respectively, to control the electronic switches to be open or closed to discharge the first battery set and the second battery set. Specifically, the electronic switches include a first switch KEY1, a second switch KEY2, and a third switch KEY3; when the main control chip (MCU) controls the first switch KEY1 and the second switch KEY2 to be closed and the third switch KEY3 to be open, the first battery set 11 and the second battery set 12 are connected in parallel with each other; and when the main control chip (MCU) controls the first switch KEY1 and the second switch KEY2 to be open and the third switch KEY3 to be closed, the first battery set 11 and the second battery set 12 are connected in series with each other.

The self-locking circuit connected with the switch control circuit to disable the electronic switches KEY1-KEY3 (i.e., the electronic switches KEY1-KEY3 are all turned off) when the switch control circuit is prohibited, and at that time, the switch control circuit is no longer controlled by the main control chip (MCU). It is to be noted that the event that "the switch control circuit is prohibited" usually occurs after the battery pack power supply system is installed to the electric tool, and when the extended power output interface 20 is not covered and can be used normally, the battery pack and a contact tab 40 of the electric tool abut against each other, and to prevent a short circuit of the first battery set 11 and the second battery set 12, the switch control circuit needs to be automatically locked, and at that time, the switch control circuit is no longer controlled by the main control chip (MCU).

Specifically, the contact tab 40 includes a base 41 and male tabs 42 disposed on the base 41, the male tabs 42 including a first male tab 421, a communication male tab 422, a connection male tab 423, and a second male tab 424 arranged successively along a length direction of the base 41, each of the first male tab 421, the second male tab 424 and the connection male tab 423 including two connection tabs 420 arranged side by side, an extension direction of the connection tabs 420 being perpendicular to the length direction of the base 41. When the battery pack power system is inserted into the electric tool, abutting terminals (not shown) in the battery pack directly selectively abut against the connection tabs 420 of the first male tab 421, the second male tab 424 and the connection male tab 423, and the communication male tab 422, to achieve series and parallel connection of the first battery set 11 and the second battery set 12.

The self-locking circuit is based on a structural and electronic mechanism, and is equivalent to a switch; the moment the abutting terminals in the battery pack abut against the contact tab 40, an effect equivalent to switch closure is achieved, and the abutting terminals are brought into electrical conduction with the contact tab 40; at this time, the contact tab 40 disables the electronic switches, such that the electronic switches KEY1-KEY3 are all opened and no longer operate, and the series and parallel connection of the first battery set 11 and the second battery set 12 is only controlled by the contact tab 40 at this time.

Figure 5:
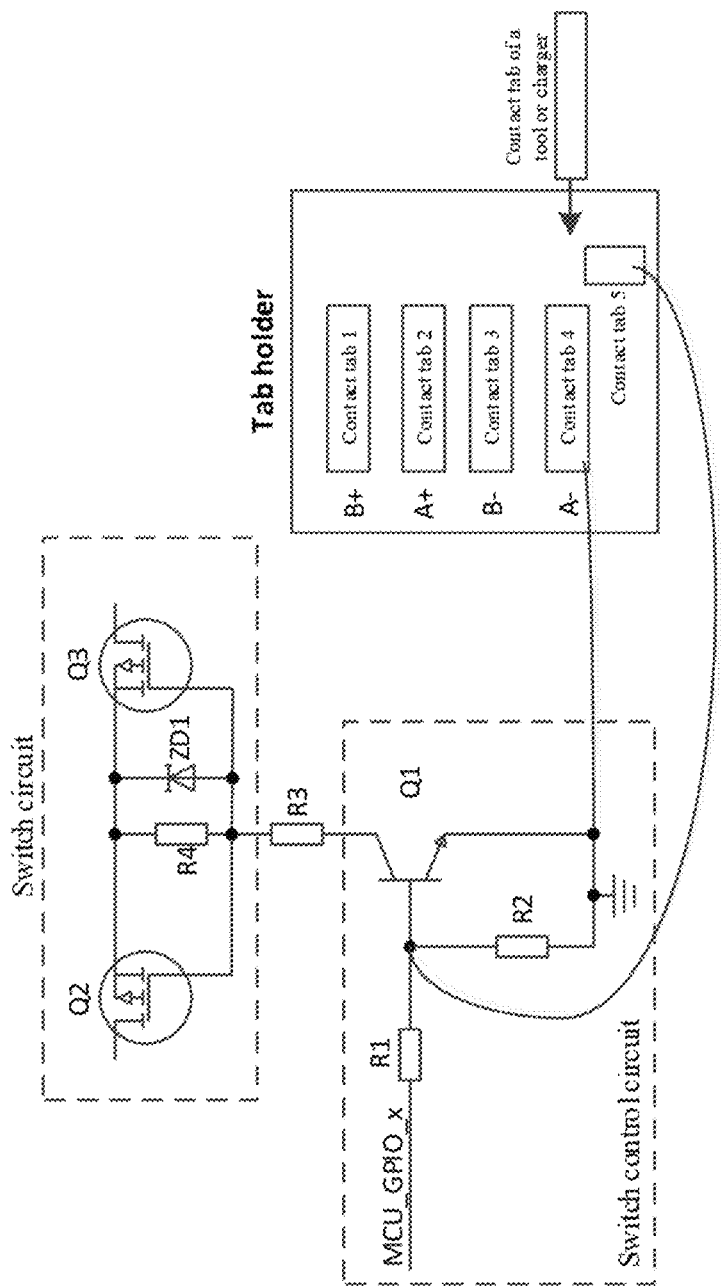
FIG. 5 is a working principle diagram of a self-locking circuit in FIG. 1.

Specifically, as shown in FIG. 5, a contact tab 1, a contact tab 2, a contact tab 3, and a contact tab 4s are provided in a tab holder of the self-locking circuit, and the 4 contact tabs correspond to positive and negative poles of Group B and Group B batteries, respectively, wherein the contact tab 1 corresponds to the positive poles (B+) of the Group B batteries, the contact tab 2 corresponds to the positive poles (A+) of the Group A batteries, the contact tab 3 corresponds to the negative poles (B−) of the Group B batteries, and the contact tab 4 corresponds to the negative poles (A−, which is also reference ground GND of the main control chip MCU) of Group A batteries. The contact tab 4 and a contact tab 5 are key devices of the self-locking circuit.

Since the switch control circuit and the switch circuit of each of the electronic switches KEY1-KEY3 are the same, only one of the switches is explained as an example here. In FIG. 5, MCU_GPIO_x is connected to an output pin of the main control chip MCU. When MCU_GPIO_x outputs a high level, Q1 is turned on, thus Q2 and Q3 are also turned on, and the corresponding electronic switch is closed; and when MCU_GPIO_x outputs a low level, Q1 is turned off, thus Q2 and Q3 are also turned off, and the corresponding electronic switch is opened; therefore, the closing and opening of the electronic switch are determined by the high and low levels output by MCU_GPIO_x.

The contact tab 4 in the tab holder is grounded, and the contact tab 5 is connected to the junction of R2 and R1. When the contact tab 40 of the electric tool or charger is inserted into the tab holder, the male tab 42 causes a short circuit of the contact tab 4 and the contact tab 5, i.e., a short circuit of R2; and at this time Q1 is no longer controlled by the main control chip MCU, the electronic switches KEY1-KEY3 are all opened and no longer operate, and the series and parallel connection of the first batter 11 and the second battery set 12 is only controlled by the contact tab 40.

Of course, the above description of the specific structure of the contact tab 40 is only exemplary, and those skilled in the art can make changes according to the actual situation.

The main control chip (MCU) is configured to control the entire battery pack power supply system, and the wake-up circuit is connected with the main control chip (MCU), to wake up the entire battery pack power supply system. In this embodiment, the wake-up circuit includes a microswitch wake-up circuit and a buttoned wake-up circuit, the microswitch wake-up circuit including a microswitch 13, and when the cover plate 30 slides to expose the extended power output interface 20, the cover plate 30 synchronously triggers the microswitch 13, such that the entire battery pack power supply system is woken up.

The microswitch 13 includes a switch body 131 and a terminal (not shown) accommodated in the switch body 131 and electrically connected to a circuit board, the terminal being electrically connected to the first battery set 11 and the second battery set 12 through the circuit board. The microswitch 13 also includes a contact point (not marked) provided on the switch body 131, and a rectangular contact piece 132, wherein one end of the contact piece 132 is fixed to the switch body 131 and the other end thereof is a free end; the contact point is located on an inner side of the contact piece 132 and close to the fixed end of the contact piece 132; the contact piece 132 repeatedly touches the contact point of the microswitch 13 in a lever-like manner; an elastic member (not shown) is provided between the contact piece 132 and the switch body 131; when the contact piece 132 presses the contact point through the trigger part 32, the terminal is brought into conduction; and when the contact piece 132 leaves the contact under the action of the elastic member, the contact point returns to an untriggered state, and the terminal is brought out of conduction. The trigger part 32 is preferably a plate-like structure, which aids the trigger part 32 in pushing the contact piece 132 to rotate.

The microswitch wake-up circuit is configured to power up the battery pack and the USB circuit at the same time, so that the battery pack and the USB circuit are woken up synchronously; and the buttoned wake-up circuit is configured to wake up the battery pack, while the USB circuit is selectively woken up according to the actual situation. When the battery pack power supply system is not working, if one wants to check the charge of the battery pack, s/he does not need to plug in a USB charging cable or trigger the microswitch 13; instead, s/he can simply press a button on the battery pack housing and check the charge using the buttoned wake-up circuit, which is convenient and safe.

The USB circuit is connected with the first battery set 11, the second battery set 12, and the main control chip (MCU), respectively, to output power for charging an external device under the control of the main control chip (MCU). It may be understood that, with the development of external devices, charging interfaces of external devices have accordingly developed into several types, including the following common ones: Mini USB interfaces, Micro USB interfaces (including 2.0 and 3.0), and Type series interfaces (including Type-A, Type-B and Type-C). The USB circuit in the present disclosure may be may be configured to correspond to one of the aforementioned types of interfaces, or it may be configured to be standard USB2.0 or USB3.0, and then an adapter is used for adaptation, so long as the external device (including a mobile phone, computer, printer, or display) can be charged.

The USB circuit is provided with a step-down component (such as a transformer, not shown) and a current-limiting component (such as a DC-DC voltage-regulating and current-limiting chip, not shown) to perform voltage step-down and current-limiting operations on a voltage output from the battery pack power supply system, such that a voltage after the step-down and current-limiting operations may be output to charge the external device. Of course, when the main control chip (MCU) detects no charging current flowing through the USB circuit, the USB circuit is directly disabled, and the entire battery pack supply system shuts down 1 minute later.

The battery pack power supply system further includes a first analog front-end 14 connected in parallel with the first battery set 11 and a second analog front-end 15 connected in parallel with the second battery set 12; the first analog front-end 14 is connected with the main control chip (MCU) to measure the real time voltage of the first battery set 11 and transmit the voltage to the main control chip (MCU); and the second analog front-end 15 is connected with the main control chip (MCU) to measure the real time voltage of the second battery set 12 and transmit the voltage to the main control chip (MCU). Of course, when the voltages of the first battery set 11 and second battery set 12 are lower than a certain value, the main control chip (MCU) disables the USB circuit to stop charging the external device and controls the entire battery pack power supply system to shut down, to wait for charging.

The first analog front-end 14 communicates with the main control chip (MCU) through a first communication channel 16, so that when the main control chip (MCU) needs to measure the voltage of any cell in the first battery set 11, the first communication channel 16 may be used to transmit an instruction, and the first analog front-end 14, upon receiving the instruction, quickly detects and extracts the voltage value of the corresponding cell, and then converts the voltage value into a digital signal and sends the digital signal to the main control chip (MCU) through the first communication channel 16.

The battery pack power supply system further includes a communication isolation circuit 17. The communication isolation circuit 17 is connected to the second analog front-end 15 at one end and to the main control chip (MCU) at the other end, so that the second analog front-end 15 communicates with the main control chip (MCU) in a bidirectional isolation manner through the communication isolation circuit 17, and then information of the second analog front-end 15 is controlled and read. In some embodiment, the second analog front-end 15, the communication isolation circuit 17 and the main control chip (MCU) communicate with each other through a second communication channel 18, and for the specific communication process, reference may be made to the communication process between the first analog front-end 14 and the main control chip (MCU) described above.

Figure 6:
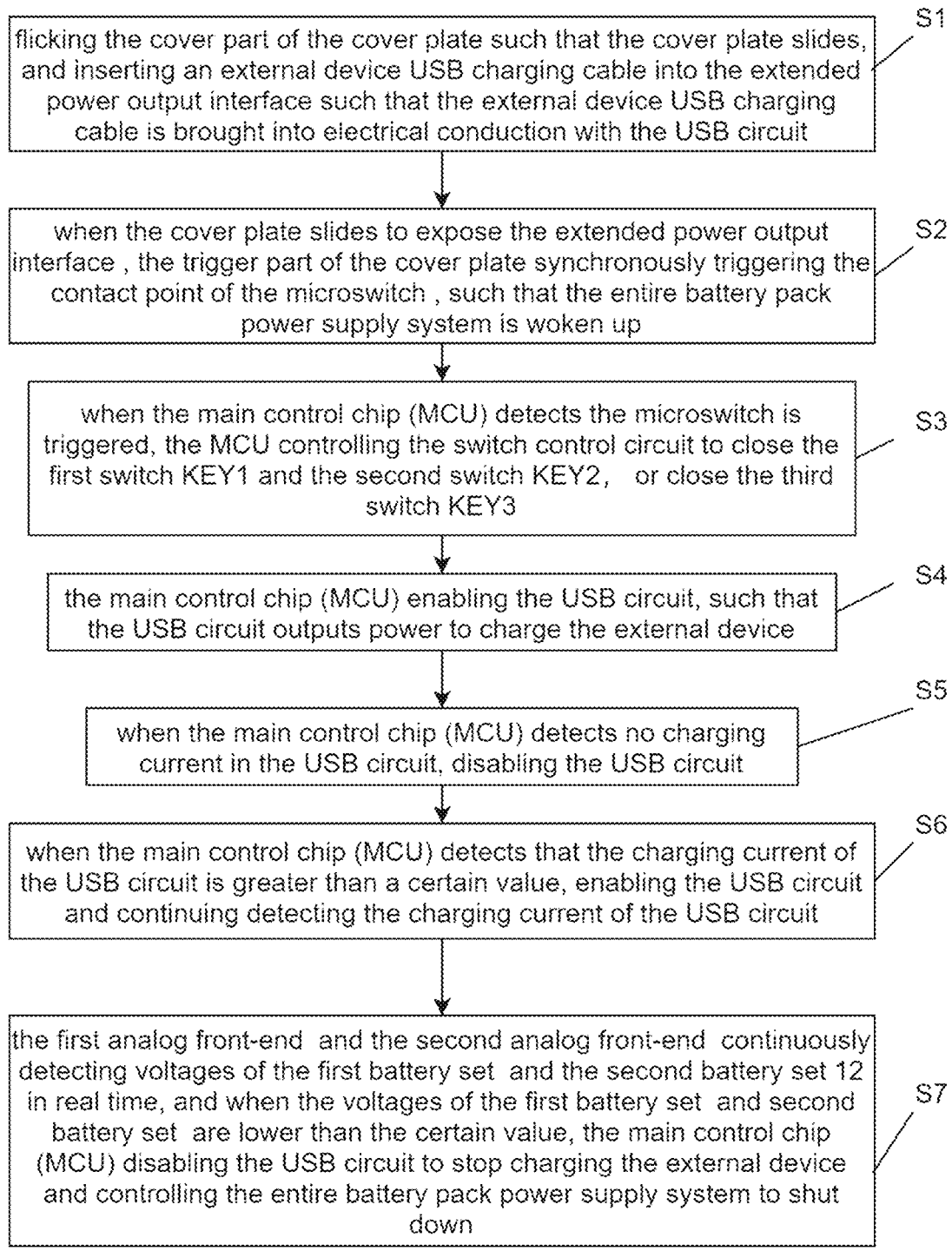
FIG. 6 is a flow diagram of a battery pack power supply method corresponding to FIG. 1.

As shown in FIG. 6, the present disclosure further provides a battery pack power supply method applied to the aforementioned battery pack power supply system, which mainly includes the following steps:

S1, flicking the cover part 31 of the cover plate 30 such that the cover plate 30 slides, and inserting an external device USB charging cable into the extended power output interface 20 such that the external device USB charging cable is brought into electrical conduction with the USB circuit;

S2, when the cover plate 30 slides to expose the extended power output interface 20, the trigger part 32 of the cover plate 30 synchronously triggering the contact point of the microswitch 13, such that the entire battery pack power supply system is woken up;

S3, when the main control chip (MCU) detects the microswitch 13 is triggered, the main control chip (MCU) controlling the switch control circuit to close the first switch KEY1 and the second switch KEY2, such that the first battery set 11 and the second battery set 12 are connected in parallel, or to close the third switch KEY3, such that the first battery set 11 and the second battery set 12 are connected in series, and at this time, the first battery set 11 and the second battery set 12 are discharged;

S4, the main control chip (MCU) enabling the USB circuit, such that the USB circuit outputs power to charge the external device;

S5, when the main control chip (MCU) detects no charging current in the USB circuit, disabling the USB circuit;

S6, when the main control chip (MCU) detects that the charging current of the USB circuit is greater than a certain value, enabling the USB circuit and continuing detecting the charging current of the USB circuit; and S7, the first analog front-end 14 and the second analog front-end 15 continuously detecting voltages of the first battery set 11 and the second battery set 12 in real time, and when the voltages of the first battery set 11 and second battery set 12 are lower than the certain value, the main control chip (MCU) disabling the USB circuit to stop charging the external device and controlling the entire battery pack power supply system to shut down.

Of course, this embodiment is mainly applicable when the battery pack power supply system is not put into an electric tool, in which case, the USB circuit may be used to charge an external device such as a mobile phone; and after the battery pack power supply system is plugged into an electric tool, the extended power output interface 20 is covered and cannot be used, and at the same time, the battery pack power supply system and the contact tab 40 of the electric tool abut against each other, to achieve series or parallel connection of the first battery set 11 and the second battery set 12, and at this time the switch control circuit is disabled (i.e., automatically locked), and the self-locking circuit causes a failure in the electronic switches KEY1-KEY3.

Figure 7:
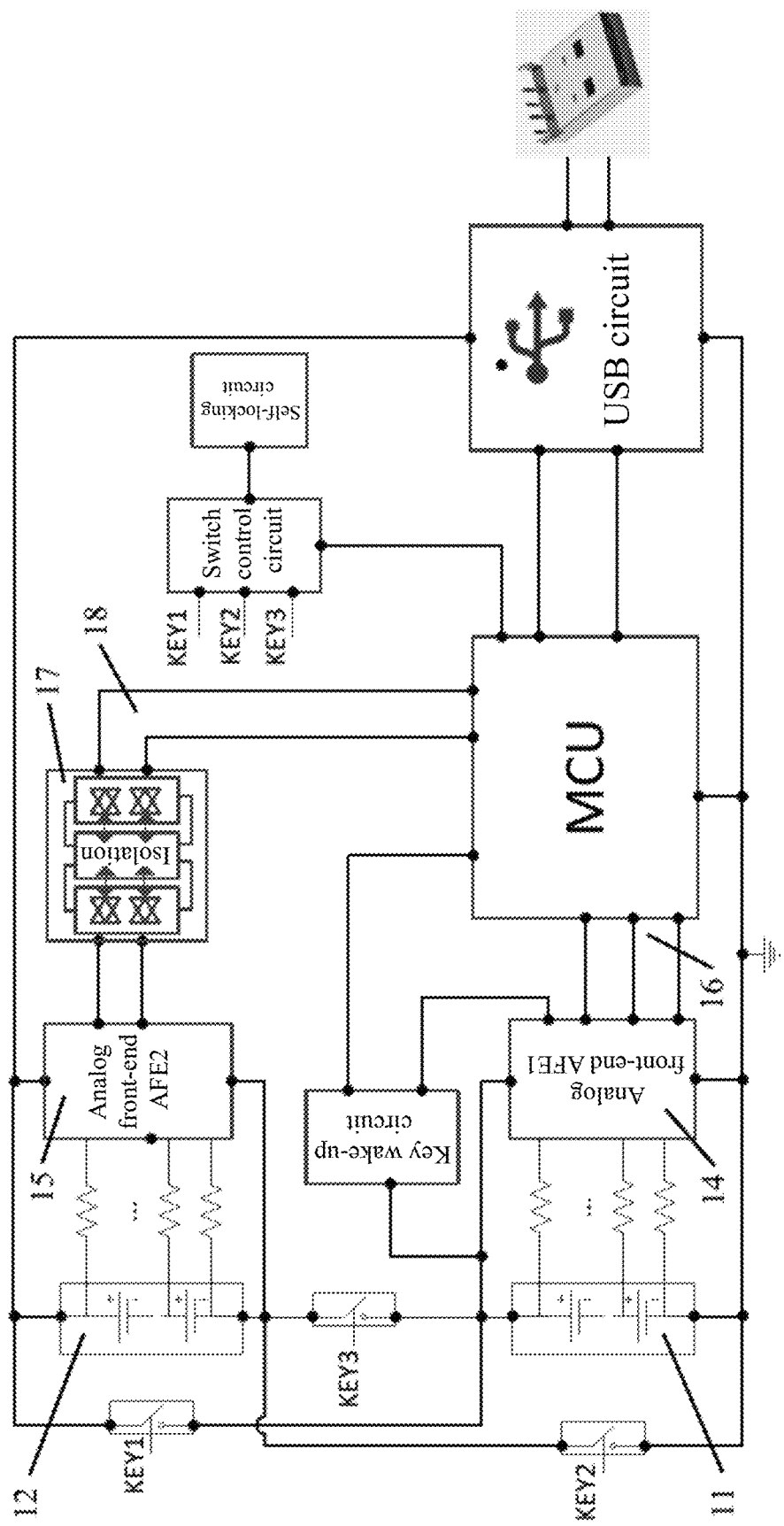
FIG. 7 is a structure diagram of a second embodiment of a battery pack power supply system of the present disclosure.

FIG. 7 shows a second embodiment of the battery pack power supply system of the present disclosure. Compared with the first embodiment shown in FIG. 1, this embodiment mainly differs in that the microswitch wake-up circuit is omitted, and the extended power output interface 20 may also be used to charge an external device after the battery pack power system is plugged into an electrical tool.

In this embodiment, the wake-up circuit is a buttoned wake-up circuit, the buttoned wake-up circuit including a button (not shown) provided on the housing, such that the entire battery pack power supply system is woken up after the button is pressed. Other identical structures (such as the switch control circuit, the self-locking circuit, the USB circuit, the main control chip MCU, the first analog front-end 14, the second analog front-end 15, and the communication isolation circuit 17) are not described.

Figure 8:
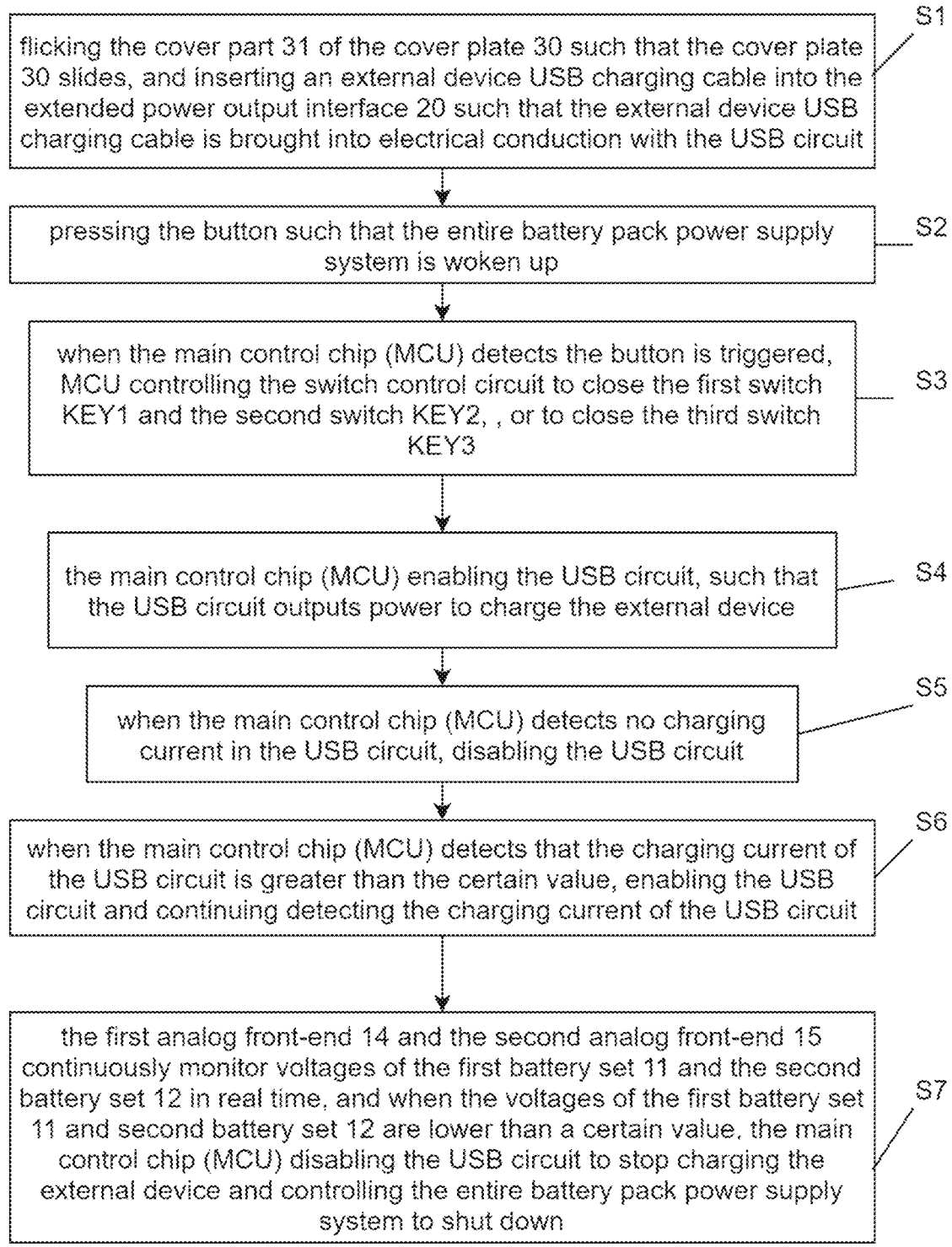
FIG. 8 is a flowchart showing a battery pack power supply method corresponding to FIG. 7.

As shown in FIG. 8, a battery pack power supply method in this embodiment mainly includes the following steps:

S1, flicking the cover part 31 of the cover plate 30 such that the cover plate 30 slides, and inserting an external device USB charging cable into the extended power output interface 20 such that the external device USB charging cable is brought into electrical conduction with the USB circuit;

S2, pressing the button such that the entire battery pack power supply system is woken up;

S3, when the main control chip (MCU) detects the button is triggered, the main control chip (MCU) controlling the switch control circuit to close the first switch KEY1 and the second switch KEY2, such that the first battery set 11 and the second battery set 12 are connected in parallel, or to close the third switch KEY3, such that the first battery set 11 and the second battery set are 12 are connected in series, and at that time, the first battery set 11 and the second battery set 12 are discharged;

S4, the main control chip (MCU) enabling the USB circuit, such that the USB circuit outputs power to charge the external device;

S5, when the main control chip (MCU) detects no charging current in the USB circuit, disabling the USB circuit;

S6, when the main control chip (MCU) detects that the charging current of the USB circuit is greater than the certain value, enabling the USB circuit and continuing detecting the charging current of the USB circuit; and S7, the first analog front-end 14 and the second analog front-end 15 continuously monitor voltages of the first battery set 11 and the second battery set 12 in real time, and when the voltages of the first battery set 11 and second battery set 12 are lower than a certain value, the main control chip (MCU) disabling the USB circuit to stop charging the external device and controlling the entire battery pack power supply system to shut down.

Of course, this embodiment may be used when the battery pack power supply system is put into an electric tool, and may also be used when the battery pack power supply system is not put into an electric tool, and the USB circuit is used to charge an external device such as a mobile phone; and after the battery pack power supply system is plugged into an electric tool, the extended power output interface 20 is ready for charging an external device, and at the same time, the battery pack power supply system and the contact tab 40 of the electric tool abut against each other, to achieve series or parallel connection of the first battery set 11 and the second battery set 12, and at this time, the switch control circuit is disabled (i.e., automatically locked), and the self-locking circuit causes a failure in the electronic switches KEY1-KEY3 (i.e., the electronic switches KEY1-KEY3 are all opened).

The use of the self-locking circuitry protects the battery pack from damage. This is because the electronic switches KEY1-KEY3 are connected in series or parallel, while the contact tab 40 of the electric tool is connected in parallel or in series, and if the electronic switches KEY1-KEY3 are not disabled, it will cause a short circuit of the two battery sets. The self-locking circuit solves this problem because the moment the battery pack comes into contact with the contact tab 40, the contact tab 40 disables the electronic switches KEY1-KEY3, such that the electronic switches KEY1-KEY3 all enter a failure (opened) state, and no longer operate, and the series and parallel connection of the first battery set 11 and the second battery set 12 is then only controlled by the contact tab 40 of the electric tool.

In summary, on the one hand, with the USB circuit provided in the present disclosure, voltage step-down and current-limiting operations may be performed by the USB circuit on the voltage output from the battery pack power supply system, such that the voltage after the step-down and current-limiting operations may be used to charge the external device such as a mobile phone, so the battery pack may be used in more scenarios; on the other hand, the self-locking circuit is provided such that when the switch control circuit is disabled, the self-locking circuit can make the electronic switches KEY1-KEY3 fail and no longer controlled by the main control chip (MCU), thereby protecting the entire battery pack power supply system.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A battery pack, comprising:
   a housing;
   a plurality of battery sets, arranged in the housing; and
   a power supply system, comprises:
     a switch control circuit, connected to the plurality of battery sets, for controlling a series-parallel connection mode of the plurality of battery sets;
     a main control chip, connected to the plurality of battery sets and the switch control circuit, for controlling the discharge of the plurality of battery sets by the switch control circuit;
     a wake-up circuit, connected to the main control chip for waking up the power supply system of the battery pack when the main control chip receives a wake-up signal;
     a self-locking circuit, connected to the switch control circuit, wherein the switch control circuit switches to a disabled state when the self-locking circuit is triggered; and
     a USB circuit and an extended power output interface, connected to the plurality of battery sets for outputting power to charge external devices.

2. The battery pack according to claim 1, wherein the plurality of battery sets comprises a first battery set and a second battery set, the first battery set and the second battery set being connected in series or in parallel in a manner controlled by the switch control circuit.

3. The battery pack according to claim 2, wherein the switch control circuit comprises a first switch, a second switch and a third switch, the first battery set and the second battery set being connected in parallel with each other when the main control chip controls the first switch and the second switch to be closed and the third switch to be open, the first battery set and the second battery set being connected in series with each other when the main control chip controls the first switch and the second switch to be open and the third switch to be closed.

4. The battery pack according to claim 1, wherein the plurality of battery sets comprises a first battery set and a second battery set, the first battery set and the second battery set being connected in series or parallel in relation to each other controlled by a contact tab of an electric tool to which the battery pack is connected.

5. The battery pack according to claim 1, wherein the housing is provided with a cover plate for covering the extended power output interface, the cover plate being slidably provided to expose or cover the extended power output interface.

6. The battery pack according to claim 5, wherein the wake-up circuit comprises a microswitch wake-up circuit, the microswitch wake-up circuit comprising a microswitch, the microswitch being triggered when the extended power output interface is exposed and the power supply system of the battery pack being awakened.

7. The battery pack according to claim 1, wherein the wake-up circuit is a buttoned wake-up circuit, the buttoned wake-up circuit comprises a button provided on the housing, and the power supply system of the battery pack is woken up after the button is pressed.

8. The battery pack according to claim 1, wherein when a voltage of the battery pack is lower than a certain value, the main control chip disables the USB circuit in order to stop charging the external device and controls the power supply system of the battery pack to shut down.

9. The battery pack according to claim 1, wherein the extended power output interface comprises a Mini USB interface or a Micro USB interface or a Type series interface.

10. The battery pack according to claim 1, wherein when the battery pack is connected to an electric tool, the self-locking circuit is triggered and the switch control circuit is switched to a disabled state.

11. A battery pack, comprising:
    a housing;
    a plurality of battery sets, arranged in the housing, and the plurality of battery sets being switchable in a series-parallel connection method; and
    a power supply system, comprises:
      a switch control circuit, configured to be connected to the plurality of battery sets, for controlling the series-parallel connection method of the plurality of battery sets, a main control chip, connected to the plurality of battery sets and the switch control circuit, for controlling the plurality of battery sets to be discharged via the switch control circuit, and
      an extended power output interface, connected to the plurality of battery sets, for outputting power to charge an external device;
    wherein, when the battery pack is connected to an electric tool, the plurality of battery sets is connected in series or parallel in a locked manner and the switch control circuit is disconnected from the main control chip.

12. The battery pack according to claim 11, wherein the plurality of battery sets comprises a first battery set and a second battery set, the first battery set and the second battery set being connected in series or in parallel in a manner controlled by the switch control circuit.

13. The battery pack according to claim 12, wherein the switch control circuit comprise a first switch, a second switch and a third switch, the first battery set and the second battery set being connected in parallel with each other when the main control chip controls the first switch and the second switch to be closed and the third switch to be open, the first battery set and the second battery set being connected in series with each other when the main control chip controls the first switch and the second switch to be open and the third switch to be closed.

14. The battery pack according to claim 11, further comprising a wake-up circuit, connected to the main control chip, to wake up the power supply system of the battery pack when the main control chip receives a wake-up signal.

15. The battery pack according to claim 14, wherein the wake-up circuit is a buttoned wake-up circuit, the buttoned wake-up circuit comprises a button provided on the housing, the button being electrically connected to the main control chip, and upon pressing the button, the power supply system of the battery pack is awakened.

16. The battery pack according to claim 14, wherein the wake-up circuit comprises a microswitch wake-up circuit, the microswitch wake-up circuit comprises a microswitch, when the microswitch is triggered, the power supply system of the battery pack is awakened.

17. The battery pack according to claim 16, wherein the housing is provided with a cover plate for covering the extended power output interface, the cover plate being slidably provided to expose or cover the extended power output interface, and when the extended power output interface is exposed, the microswitch is triggered and the power supply system of the battery pack is awakened.

18. The battery pack according to claim 11, wherein the extended power output interface comprises a Mini USB interface or a Micro USB interface or a Type series interface.

19. The battery pack according to claim 11, further comprising a self-locking circuit, coupled to the switch control circuit, for causing the switch control circuit to be disabled when the battery pack is connected to the electric tool.

20. A battery pack, comprising:
a housing;
a plurality of battery sets, arranged in the housing, and the plurality of battery sets being switchable in a series-parallel connection mode;
a main control chip, connected to the plurality of battery sets and for controlling the series-parallel connection mode of the plurality of battery sets; and
an extended power output interface, connected to the plurality of battery sets and for outputting power from the plurality of battery sets to charge an external device; and
a USB circuit and the extended power output interface, connected to the plurality of battery sets for outputting power to charge external devices, and the USB circuit provided with a step-down component and a current-limiting component to perform voltage step-down and current-limiting operations on a voltage output from the battery pack and then charge the external device;
wherein the series-parallel connection mode of the plurality of battery sets is locked when the battery pack is connected to an electric tool.

* * * * *